Figure 1:
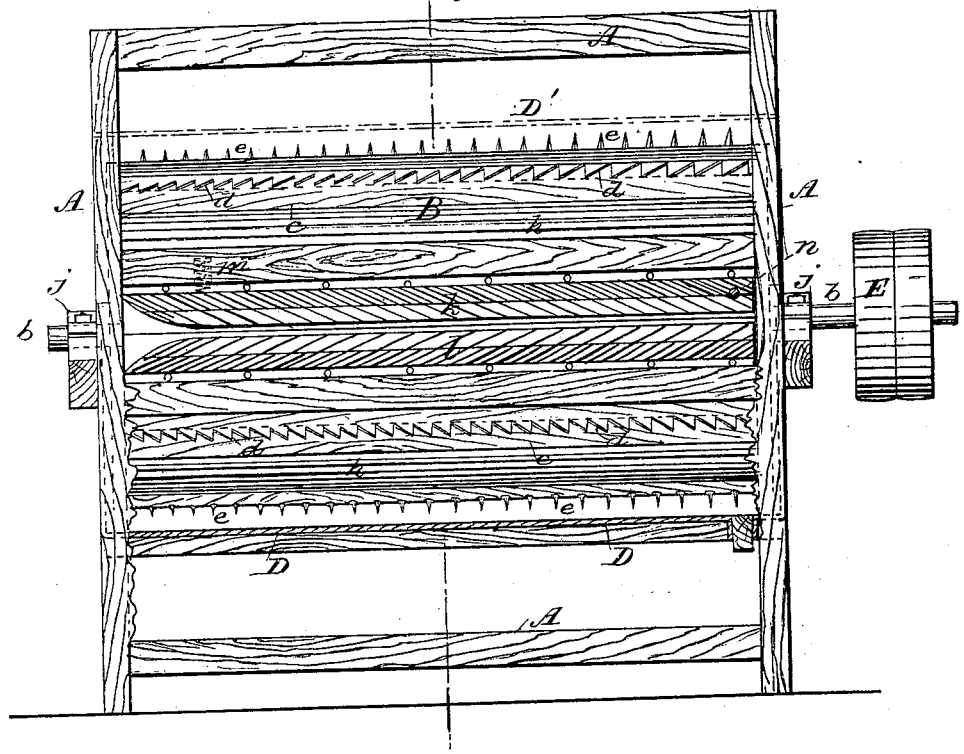

(No Model.)

F. LUFT.
DISINTEGRATING MACHINE FOR JUTE, &c.

No. 266,038. Patented Oct. 17, 1882.

WITNESSES
L. F. Keleher.
S. G. Vogt.

INVENTOR
Franz Luft,
By T. C. Brecht,
Attorney

N. PETERS. Photo-Lithographer, Washington, D. C.

UNITED STATES PATENT OFFICE.

FRANZ LUFT, OF NEW ORLEANS, LOUISIANA.

DISINTEGRATING-MACHINE FOR JUTE, &c.

SPECIFICATION forming part of Letters Patent No. 266,038, dated October 17, 1882.

Application filed March 23, 1882. (No model.)

*To all whom it may concern:*

Be it known that I, FRANZ LUFT, a citizen of the United States, residing at New Orleans, in the parish of Orleans and State of Louisiana, have invented certain new and useful Improvements in Disintegrating - Machines for Jute, &c.; and I do hereby declare the following to be a full, clear, and exact description of the invention, such as will enable others skilled in the art to which it appertains to make and use the same.

My invention relates to improvements in machines for disintegrating and separating the fibers of jute, cane, or other materials or substances containing fibers of any kind, to be used for packing or other purposes. The object is to construct a machine by which such fibers can be obtained from any material or substance containing the same in a very economical and thorough manner.

The invention consists in the construction and arrangement of parts, all of which will be more fully described hereinafter, reference being had to the accompanying drawings and the letters of reference marked thereon.

Like letters refer to like parts in the drawings, in which—

Figure 2:
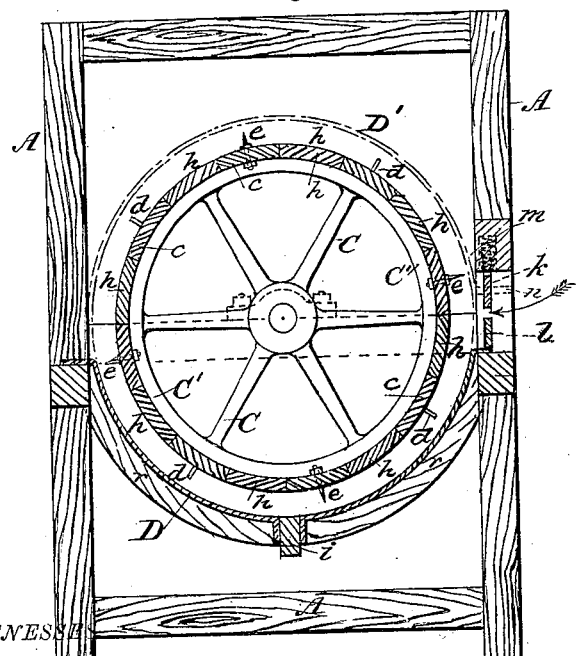
Figure 3:
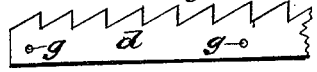
Figure 4:
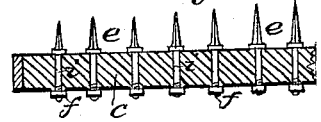

Figure 1 is a front elevation of my machine. Fig. 2 is a vertical cross-section of the same. Fig. 3, 4, 5, and 6 are detail views of some of the parts more definitely described hereinafter.

Figure 5:
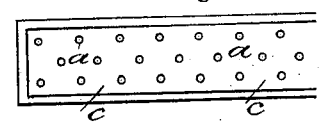
Figure 6:
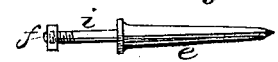

In the drawings, A represents a suitable strong frame, in which a cylinder, B, is journaled in bearings $j$ at each end. The shaft $b$ of this cylinder projects at one end to receive the driving-pulleys E. This cylinder is constructed of a spider, C, with rims C', to which a series of staves or sections, $c$ and $h$, are secured. Of these, four in this instance are provided with saw-teeth $d$, while four others are provided with knives $e$. The saw-teeth and knives are both graduated in length from one side to the other, so that the material fed at one side to the machine is gradually reduced or comminuted more and more. The knives $e$ are arranged in staggering holes $a$, as shown in Fig. 5, and secured in the staves by nuts $f$, screwed on the ends of the bolts $i$. The saw-teeth are held in place by pins $g$, passing through the staves, into which they are inserted or clamped. The space in the cylinder between the staves $c$, containing the saw-teeth and knives, is preferably filled in or closed by plain staves $h$. If desired, however, these staves may also be supplied with saw-teeth and knives, although I do not consider it necessary. Below the cylinder is arranged a semicircular sheet-metal receptacle, D, with wooden ribs $r$, and closed at its ends for containing water, and it has an outlet-opening, $i$, through which the water and disintegrated material can be withdrawn when desired. As close as possible (say about one and one-half inch from the cylinder) are arranged two metal feed-bars, $k$ $l$. The upper one, $k$, is pivoted at one end, as shown at $n$, and at the opposite end it rests upon springs $m$, and has a slight vibratory motion of about one-fourth inch. By these feed-bars the material—such as jute, cane, bamboo, &c.—from which the fibers are obtained is fed to the cylinder B, and as it is caught up by the saw-teeth and knives on the cylinder and between the receptacle D it is thoroughly disintegrated and torn into fine shreds or fibers. The water contained in the receptacle D assists in softening the fibrous material, which has preferably first been subjected and crushed by a revolving stone rolling on a bed-plate in an annular basin, described and shown in my application, Case A. A cover, D', of sheet metal, is preferably placed over the upper part of the cylinder, as shown in broken lines in Figs. 1 and 2, to prevent the material from being scattered or thrown about the room or building containing the machine.

The size of the machine may be varied according to circumstances and requirements of the case, being larger or smaller, and made to contain more or less knives and saw-teeth. The spider C, to which the rings C' are secured, are placed at each end of the cylinder, and in the center, if desired, and serve to support the staves. In case any of these or the knives or saw-teeth become broken or worn out, it will be readily seen that they can be easily repaired or replaced by new ones. The parts can be made of any suitable material, although I prefer to make the cylinder of wooden staves secured to iron spiders, and the knives and saw-teeth of steel or hardened iron.

The material to be operated on is fed to the bars k l, as shown by the arrow in Fig. 2, and is disintegrated more and more by means of the knives and saw-teeth and receptacle D, and when fine enough it is withdrawn with the water from this receptacle D. The feed-bars k l are rounded on their edges at one end, so that the material can be easier fed or placed between them, and by pivoting the upper bar, k, it can yield slightly at the feed end, and will be forced back to its normal position by the spring m.

Having thus described my invention, what I claim, and desire to secure by Letters Patent, is—

1. In a machine for disintegrating fibrous material, a cylinder, B, made of a series of staves provided with graduated saw-teeth and knives, and secured to spiders C C', substantially as specified.

2. In a disintegrating-machine for fibrous material, the cylinder B, constructed of staves c, provided alternately with saw-teeth d and knives e, and secured to suitable spiders, substantially as set forth.

3. In a disintegrating-machine, a cylinder, B, having a series of staves, c, provided with removable knives e and saw-teeth d, made of graduated size from one side to the other of the cylinder, and plain staves h, substantially as and for the purpose specified.

4. In a disintegrating-machine, the cylinder B, provided with staves c, having saw-teeth d and knives e, secured to suitable spiders C C', in combination with the feed-bars k l, arranged substantially as shown, and for the purpose specified.

5. In a disintegrating-machine, the combination of a frame, A, the cylinder B, consisting of the spiders C C', the series of staves c, provided with graduated saw-teeth d and knives e, with the feed-bars k l and the receptacle D, all constructed and arranged substantially as shown, and for the purpose set forth.

In testimony whereof I hereby affix my signature in presence of two witnesses.

FRANZ LUFT.

Witnesses:
N. LAUDEY,
SAMUEL G. VOGL.